US012487890B2

(12) United States Patent
Choy et al.

(10) Patent No.: US 12,487,890 B2
(45) Date of Patent: Dec. 2, 2025

(54) AUTOMATED DATA BACKUP

(71) Applicant: Salesforce, Inc., San Francisco, CA (US)

(72) Inventors: Jason K. S. Choy, Short Hills, NJ (US); Adrian Edward Kunzle, New York, NY (US); Harel Oz Yadgar, Jerusalem (IL); Etai Litov, Gan-Yavne (IL)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/511,383

(22) Filed: Nov. 16, 2023

(65) Prior Publication Data

US 2025/0165351 A1   May 22, 2025

(51) Int. Cl.
G06F 11/14 (2006.01)
(52) U.S. Cl.
CPC ...... *G06F 11/1458* (2013.01); *G06F 2201/84* (2013.01)
(58) Field of Classification Search
USPC .......................................................... 707/654
See application file for complete search history.

(56) References Cited

U.S. PATENT DOCUMENTS

| 7,509,468 | B1 | 3/2009 | Dalal et al. |
| 8,260,750 | B1 | 9/2012 | Gugick et al. |
| 10,180,885 | B2 * | 1/2019 | Blackburn .......... G06F 11/1466 |
| 10,936,435 | B2 | 3/2021 | Natanzon et al. |
| 11,108,859 | B2 | 8/2021 | Das et al. |
| 2012/0089572 | A1 | 4/2012 | Raichstein et al. |
| 2015/0186076 | A1 * | 7/2015 | Andrews ............... G06F 12/084 711/113 |
| 2018/0024893 | A1 * | 1/2018 | Sella ................... G06F 11/1458 707/648 |
| 2018/0189147 | A1 | 7/2018 | Banasik et al. |
| 2019/0138727 | A1 * | 5/2019 | Dontov ............... G06F 11/1464 |
| 2019/0155695 | A1 | 5/2019 | Protasov et al. |
| 2019/0163374 | A1 * | 5/2019 | Venkatesh ........... G06F 11/1076 |
| 2020/0159624 | A1 | 5/2020 | Malkov et al. |
| 2020/0311023 | A1 * | 10/2020 | Rubin ................... G06F 16/213 |

(Continued)

FOREIGN PATENT DOCUMENTS

EP   3 538 998   1/2021

OTHER PUBLICATIONS

Wikipedia.org [online], "Remote Backup Service," published on Oct. 1, 2021, retrieved on Nov. 10, 2021, retrieved from URL<https://en.wikipedia.org/wiki/Remote_backup_service>, 8 pages.

*Primary Examiner* — Joshua Bullock

(57) ABSTRACT

Methods, systems, and apparatus, including computer programs encoded on computer storage media, for backing up data. One of the methods includes, as part of a data backup process for a plurality of data objects, determining, for each of two or more data objects from the plurality of data objects and using metadata for the respective data object, a backup score that indicates an importance of the respective data object; determining different priority levels for two or more subsets of the plurality of data objects based at least in part on the backup scores; and backing up at least one of the subsets of the plurality of data objects according to the respective priorities of the subsets.

21 Claims, 2 Drawing Sheets

(56) References Cited

U.S. PATENT DOCUMENTS

| | | |
|---|---|---|
| 2021/0049075 A1 | 2/2021 | Gibbons et al. |
| 2021/0049077 A1 | 2/2021 | Gibbons et al. |
| 2021/0248041 A1 | 8/2021 | Yan et al. |
| 2021/0286678 A1* | 9/2021 | Reddy A V .......... G06F 11/1469 |
| 2022/0283907 A1* | 9/2022 | Murti ................... G06F 11/1461 |
| 2022/0391683 A1* | 12/2022 | Cmielowski ............. G06N 3/08 |
| 2023/0056105 A1 | 2/2023 | Smith et al. |
| 2023/0229565 A1 | 7/2023 | Cheriyan |
| 2023/0315552 A1* | 10/2023 | Cacheaux ........... G06F 11/1451 714/21 |
| 2024/0152818 A1* | 5/2024 | Schmidt ................. G06N 20/00 |

\* cited by examiner

AUTOMATED DATA BACKUP

BACKGROUND

Backing up data can be an important part of digital processing systems. Should systems crash, secondary backup storage is required to recover data lost during the system crash.

SUMMARY

This specification describes technologies for backing up data. These technologies generally involve determining more optimal backup actions for data based on the particulars of the data.

In some implementations, techniques described in this document improve automated data backup by prioritizing backup of one or more subsets of data in a larger collection of data. For example, systems described can obtain a collection of data. Within the collection of data, the systems can determine different priority levels for one or more subsets of data, e.g., data objects or groups of data objects. The systems can then automate backups of the one or more subsets of data using the priority levels, e.g., backup higher priority items first, more frequently, using more expensive or reliable memory storage compared to lower priority items, or a combination of these. Systems can prioritize data for backup using metadata including entity relationships, references to entities in other entities, entity fields, or a combination of these.

In general, one innovative aspect of the subject matter described in this specification can be embodied in methods that, as part of a data backup process for a plurality of data objects, include the actions of: determining, for each of two or more data objects from the plurality of data objects and using metadata for the respective data object, a backup score that indicates an importance of the respective data object; determining different priority levels for two or more subsets of the plurality of data objects based at least in part on the backup scores; and backing up at least one of the subsets of the plurality of data objects according to the respective priorities of the subsets.

Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment includes all the following features in combination.

For example, in some implementations, determining the backup score that indicates the importance of the respective data object in the plurality of data objects includes determining the backup score based on at least one or more relationship obtained from a schema that indicates relationships between different types of data objects in the plurality of data objects. In some implementations, the different types of data objects include at least one of different types of tables or different types of fields. In some implementations, actions include, as part of the data backup process: backing up the schema.

In some implementations, determining the backup score that indicates the importance of the respective data object in the plurality of data objects includes determining the backup score based on at least an impact ratio or an entity rank of the respective data object.

In some implementations, determining the backup score includes determining the backup score based at least in part on how many changes to the data object were made within a time period.

In some implementations, determining the backup score includes determining the backup score based at least in part on how many references to the respective data object are included in other data objects in the plurality of data objects. In some implementations, actions include determining the number of references to the respective data object that are included in the other data objects in the plurality of data objects, where the number of references is based at least in part on one or more artifacts for the other data objects that do not include the content of the other data objects.

In some implementations, determining the backup score includes: determining, for a child object of the respective data object in the plurality of data objects, a child backup score; and determining, for the respective data object, the backup score based at least in part on the child backup score.

In some implementations, determining the backup score includes: determining child backup scores for all children of the respective data object; and determining a combination score from the child backup scores and basing the backup score of the respective data object at least in part on the combination score. In some implementations, determining the combination score from the child backup scores includes: obtaining a discount factor; and applying the discount factor to a summation of the child backup scores.

In some implementations, determining the backup score includes: determining a number of references to the respective data object; and determining the backup score based at least in part on the number of references to the respective data object. In some implementations, the respective data object is a data field. In some implementations, actions include: determining that the backup score of the respective data object satisfies a score threshold; and in response to the determination, configuring backup monitoring for the respective data object.

In some implementations, determining the backup score of the respective data object includes determining the backup score based at least in part on a backup score determined for a previously backed up instance of the respective data object.

In some implementations, actions include, prior to backing up at least one of the subsets of the plurality of data objects: determining, using the backup scores, (1) a frequency for backing up at least one of the subsets of the plurality of data objects and (2) a location for backing up at least one of the subsets of the plurality of data objects, where backing up at least one of the subsets of the plurality of data objects at the frequency and in the location. In some implementations, the location for storing the portion of the plurality of data objects indicates a type, from a plurality of types, of computer memory to use for backup.

In some implementations, determining the backup score is done using only the metadata for the respective object.

In some implementations, actions include backing up, based at least in part on the backup scores, one or more of the plurality of data objects to a first location and a different second location.

The technology described in this specification can be implemented so as to realize one or more of the following advantages. For example, by determining which data objects, e.g., entities, to prioritize for backup, techniques described can reduce the time or processing power required for a given backup of data, e.g., by using the priorities to assign groups of data objects, such as specific tables within a priority group, to different types of storage to optimize data storage and retrieval. Optimizing data storage and retrieval can include reducing latency in data storage and retrieval, e.g., by allowing high priority data objects, e.g., that are more likely to be retrieved later, to be stored in memory devices with faster read or write speeds or low priority data objects, e.g., that are less likely to be retrieved later, to be stored in memory devices with slower read or write speeds or that consume less energy.

The technology described in this specification can be implemented to improve scheduling of different processing activities. For example, actions that include backing up data identified as high priority can take precedence over other actions to be performed by processors—e.g., backing up data with lower priority. Priority can be used for monitoring data—e.g., by increasing monitoring actions, such as ensuring an accessible backup, for data identified as high priority compared to lower priority data. Changes in priority can be used as an indicator of significant data storage changes, e.g., in the schema or metadata.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Techniques described in this specification can enable prioritized backups of data objects, e.g., entities or other appropriate types of data objects, using generated scores that indicate predicted importance. The scores, and the predicted importance, can represent a likelihood that the data object has or will be changed; is referenced by one or more other data objects, e.g., to be backed up or from the same data source; is likely to be accessed later; or a combination of these. Data objects can include data from software as a service (SaaS) or another appropriate type of storage.

Figure 1:
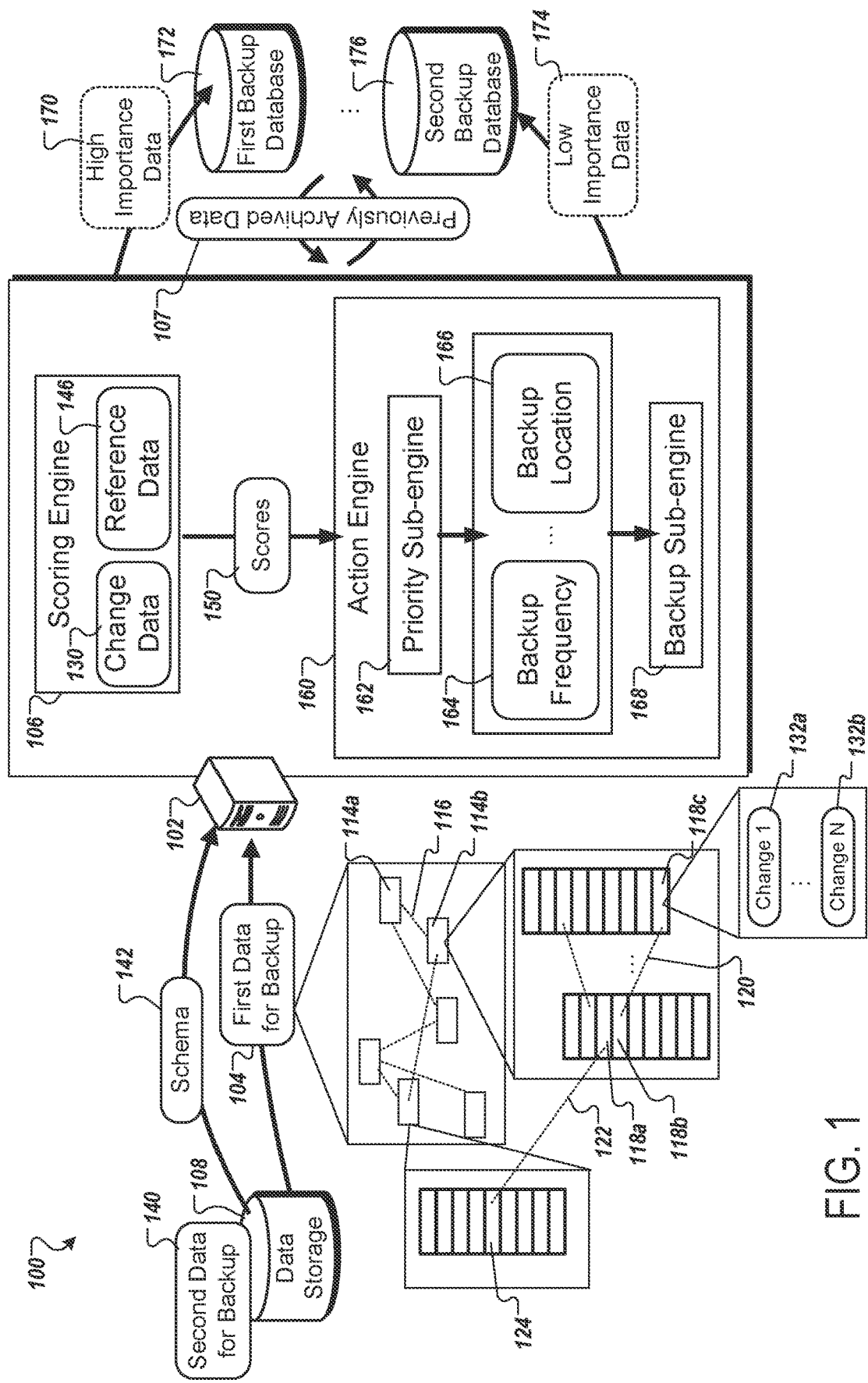
FIG. 1 shows an example backup environment.

FIG. 1 shows an example backup environment 100. In general, previously archived data, schema of data for backup, or both, can be used to prioritize the backing up data for another backup process. The previously archived data can be used to determine changes in one or more data objects also included in the data for another backup process. The schema can indicate relationships between data objects, e.g., included in one or both the previously archived data and data for another backup process. A backup system 102 of the environment 100 can determine a number of changes, relationships for one or more data objects, or both, to prioritize the backup of those data objects in the data for backup.

The backup environment 100 includes a backup system 102, data storage 108, a first backup database 172, and a second backup database 176. The backup system 102, the data storage 108, the first backup database 172, or the second backup database 176, or a combination of these can be connected using one or more networks to exchange data.

The backup system 102 maintains, for the first data for backup 104 from the data storage 108, a previously archived data 107. The first data for backup 104 can be any appropriate type of data for backup, such as a snapshot of part or all of the data storage 108. The first data for backup 104 can include data representing changes made to one or more data objects, e.g., change 1 132a and change N 132b, representing one or more changes compared to an earlier snapshot for the data storage 108, e.g., the previously archived data 107.

The backup system 102 can back up the first data for backup 104 generating previously archived data 107 prior to generating scores for subsequent data. The previously archived data 107 can include data objects, fields, or relationships shown as included in the first data for backup 104.

A scoring engine 106, using the previously archived data 107 determines change data 130 indicating changes—e.g., number of additions, modifications, deletions—to data within the first data for backup 104. The scoring engine 106 can obtain the previously archived data 107 from one or more storage databases, e.g., a first backup database 172 or second backup database 176. The scoring engine 106, using the previously archived data 107, can parse the changes 132a-b to generate the change data 130. The scoring engine 106 can use a number of changes, a number of different types of changes, or both, that were made to a data object to determine an importance score for that data object.

The backup system 102 receives the schema 142 from the data storage 108. The schema 142 indicates relationships between data objects of the second data for backup 140. The second data for backup 140 can include one or more data objects in common with the first data for backup 104 and the previously archived data 107. Some of these common data objects can be modified or different between various backup processes. For instance, the second data for backup 140 can represent a state of data, e.g., from SaaS or other data sources, subsequent in time from the first data for backup 104.

The scoring engine 106 of the backup system 102 can use the schema 142 to generate reference data 146. The schema 142 can indicate one or more relationships between data objects or fields within data objects of the second data for backup 140. The schema represents relationships between data objects or fields, e.g., similar to the relationships shown as included in the first data for backup 104. The schema can include data indicating a relationship between two or more data objects or fields but need not necessarily include the actual data objects or fields, e.g., a name indicating a particular data object or field sufficient to represent a relationship without storing contents of the data object or field. Relationships can include a data object or data field referencing another data object or field, e.g., as shown in FIG. 1 in regard to the first data for backup 104. In general, more references to or from a data object can indicate greater importance for the data object compared to another data object with fewer references to or from itself, e.g., within a SaaS data set. The scoring engine 106 can parse the schema 142 to obtain an indication of one or more relationships between one or more data objects or fields of the second data for backup 140. The scoring engine 106 can use the indications of the one or more relationships as the reference data 146.

In some implementations, the backup system 102 backs up the schema 142. For example, the backup system 102 can backup the schema 142 before using the schema 142 to generate one or more scores, during the process to back up the second data for backup 140, or a combination of both.

The scoring engine 106 generates scores 150 using the change data 130, the reference data 146, or both. In some implementations, generating the scores 150 includes generating an impact ratio and entity rank for one or more data objects. For example, generating an impact ratio can include performing one or more operations represented in the pseudocode in Table 1, below, where a number of changes can be determined using the change data 130.

TABLE 1

Pseudocode for generating impact ratio

Entity Ei where i=1 . . ., N, N is the total number of entities
Change ECi, Entity Modify EMi, Entity Creation, EAi, Entity Deletion, EDi
Weight of Importance for Create a, Modify m, Delete d
Impact Ratio IRj where i=1...N is the corresponding ratio to Ei
TotalChange TC =0
For j=1 to N
{
  ECj = m * EMj + a *EAj + d * EDj
  TC = TC + ECj
}
For j=1 to N
{
  IRj = exp (ECj / TC)
}

Generating an entity rank can include performing one or more operations represented in the pseudocode in Table 2, below, where a number of references can be determined using reference data 146.

TABLE 2

Pseudocode for generating entity rank

Entity Ei where i=1 . . ., N, N is the total number of entities
Field Fij is the field j in Entity i
NFi is the number of fields in Entity i
ERi is the EntityRank for Ei, initialized to 0
For i=1 to N {scanning through each entity}
  For j=1 to NFi {scanning through each field in the entity}
    If Fij has reference to Entity x
      ERx = ERx +1
Metadata artifacts
For k=1 to M {scanning through each metadata artifacts - assume the total is M}
  For l=1 to N {scanning through all the entity}
    If MetaDataArtifact.k has reference to Entity l
      ERl = ERl = 1

In some implementations, ER includes an indication of other obtained data. For example, ER can include an indication of metadata artifacts such as programs, triggers, screens, report, layout, or a combination of these. An indication can include a number of references within the metadata artifacts to a given entity. In some implementations, metadata artifacts are used similar to other data objects e.g., where a reference within an artifact to a data object will increase the ER of that data object.

In some implementations, generating the scores 150 includes generating a measure of importance using a generated value for impact ratio and entity rank. For example, generating a measure of importance can include performing one or more operations represented in the pseudocode in Table 3, below, where JR can represent an impact ratio generated by the scoring engine 106 using the change data 130 and ER can represent an entity rank generated by the scoring engine 106 using the reference data 146. Although the example in Table 3 uses multiplication, other examples can use any other appropriate combination operator, e.g., addition, exponential, or a weighted combination operator.

TABLE 3

Pseudocode for generating entity importance

N is the total number of entities
For i= 1 to N
  EntityImportance EI[i] = ER[i] * IR[i]

The action engine 160 of the backup system 102 uses the scores 150 to prioritize the backup of data objects included in the second data for backup 140. The action engine 160 includes a priority sub-engine 162 and a backup sub-engine 168. The action engine 160 can prioritize the backup of data in a number of ways. For example, the action engine 160 can generate a backup frequency 164 indicating some more important objects to be backed up more frequently than other, less important, objects. The action engine 160 can select a backup location 166 indicating some more important objects to be backed up in a first database with faster read or write times and other, less important, objects to be backed up in a second database with slower read or write times compared to the first database. The first backup database 172 and the second backup database 176 can be examples of backup databases with different storage costs, capabilities, or both. The action engine 160 can determine a priority for one or more data objects and backup high importance data 170 using the first backup database 172 and low importance data 174 using the second backup database 176.

The priority sub-engine 162 uses the scores 150 to determine a priority of data objects for backing up. In some implementations, the priority sub-engine 162 sorts one or more data objects using corresponding scores in the scores 150, generates a priority ranking of the data objects, or a combination of both. For example, the priority sub-engine 162 can sort a first data object as more important than a second data object using a generated score—e.g., based on the first data object having been changed more often or referenced more often compared to the second data object. The action engine 160 can determine actions to perform on objects using descending scores—e.g., performing operations, such as backup, on more important data objects corresponding to higher scores before less important data objects corresponding to lower scores.

The action engine 160 uses a priority determined by the priority sub-engine 162 to prioritize backup, e.g., by selecting or otherwise changing a backup frequency, backup location, number of backup copies stored, or a combination of these. The backup sub-engine 168 uses determined backup prioritizations—e.g., frequency, backup location, number of copies, or a combination of these—to backup data in one or more databases. For example, the backup sub-engine 168 can backup a first portion of the second data for backup 140 in the first backup database 172 and a second portion of the second data for backup 140 in the second backup database 176 using the backup location 166 generated by the action engine 160. The backup sub-engine 168 can backup a first portion of the second data for backup 140 every hour and a second portion of the second data for backup 140 every four hours using the backup frequency 164 generated by the action engine 160. Of course, frequencies other than one hour and four hours can be used, e.g., a number of seconds, minutes, hours, days, weeks, months, years, among others.

In some instances, the second data for backup 140 does not have a stored schema. In these instances, the scoring engine 106 of the backup system 102 can determine reference data 146 using one or more relationships determined from one or more previous backups, e.g., the change data 130. For example, the scoring engine 106 can parse the first data for backup 104 to identify one or more relationships—e.g., data objects 114a and 114b related by object relationship 116. The object relationship 116 can indicate that the first data object 114a references data in the second data object 114b. The object relationship 116 can indicate that one or more data fields of the first data object 114a are used in data fields of the second data object 114b or vice versa. The scoring engine 106 can parse data for the first data for backup 104 to identify one or more relationships between data fields. The data can be metadata or other appropriate data given data access, e.g., privacy, permissions.

The second data object 114b includes data fields 118a-c. The data fields 118a-c can be related to one another. For example, the second data field 118b is related to the third data field 118c by a first field relationship 120. The first data field 118a is related to another data field 124 of another data object by a second field relationship 122. The first field relationship 120 and the second field relationship 122 can indicate that the fields are using other field values, e.g., in a composite value or for calculating a new value.

In some instances, the first data for backup 104 is stored in one or more of the first backup database 172 or the second backup database 176, e.g., using the backup location 166. Data objects of the data for backup 104 that are of high importance can be stored separately from data objects of comparatively low importance when importance can be determined using generated scores as described in this specification. Storing more important data objects separately can improve efficiency of storage or retrieval—e.g., because more important data objects are more likely to be changed, requiring one or more additional backups; or are more likely to be used, requiring more data retrieval; or both. To help improve efficiency of storage or retrieval, more important data objects can be stored in memory with higher read or write efficiency.

The backup system 102 can update scores for data objects. In some implementations, the backup system 102 updates scores for data objects periodically, e.g., every backup or according to another schedule. In some implementations, the backup system 102 updates scores for data objects if a change in schema is detected, e.g., by the backup system 102. In some implementations, the backup system 102 updates scores for data objects if a change is detected. For example, a first data object can have a score associated with it that is generated by the scoring engine 106. If the first data object changed, according to a last backup of the first data object, the scoring engine 106 can determine that the first data object changed and update a score for the first data object in response. If a schema that represents the first data object changed, the scoring engine 106 can similarly generate an updated score for the first data object in response.

In some implementations, only a rank is updated when the scoring engine 106 determines schema has changed, e.g., and not an impact ratio. For example, as described in this specification, a rank can be generated for one or more data objects in data to be backed up using a schema. An impact ratio can be generated using changes in data objects—e.g., as recorded in a previous one or more backups. A score can be generated by combining these values. If a schema changes, an impact ratio can remain the same—e.g., if the number of changes previously recorded have not changed—but the rank of one or more data objects might change. In response, the scoring engine 106 can update the reference data 146 but not the change data 130 to be used for generating the scores 150 for the data objects.

In some implementations, the backup system 102 determines priority for the second data for backup 140 without previously obtaining the first data for backup 104. For example, the backup system 102 can obtain a schema or other data representing the second data for backup 140. The backup system 102 can generate scores using the reference data 146 generated from data representing the second data for backup 140. The scores can be updated—e.g., to include one or more past changes—when subsequently backing up data included in the second data for backup 140.

In some implementations, the first data for backup 104 is processed similar to the second data for backup 140. For example, the scoring engine 106 can generate scores for prioritizing backup of the first data for backup 104. In some instances, the backup system 102 uses a backup prior to the first data for backup 104 to obtain changes for data objects of the first data for backup 104.

In some implementations, scores for prioritizing storage of the first data for backup 104 to generate the previously archived data 107 can be generated using prior backups or data representing the first data for backup 104, e.g., schema, the data itself, or a combination of both. The previously archived data 107 can be used to generate scores for subsequent data, e.g., subsequent data that includes data objects in common with the previously archived data 107. For instance, when the first data for backup 104 is a first backup ever made for the data storage 108, the backup system 102 can use data representing the first data for backup 104 to prioritize backing up data objects of the first data for backup 104. For example, the backup system 102 can obtain a schema of the first data for backup 104, either separately or based on processing the first data for backup 104. The backup system 102 can obtain changes of the first data for backup 104 by processing the first data for backup 104. In some implementations, the backup system 102 backs up the first data for backup 104 without using any change data to determine the scores. For example, the backup system 102 can use only schema data, e.g., generated from a separate schema file representing relationships of data in the first data for backup 104 or from processing the first data for backup 104 itself.

The backup system 102 is an example of a system implemented as computer programs on one or more computers in one or more locations, in which the systems, components, and techniques described in this specification are implemented. A network (not shown), such as a local area network ("LAN"), wide area network ("WAN"), the Internet, or a combination thereof, can connect elements included in the environment 100. The backup system 102 can use a single computer or multiple computers operating in conjunction with one another, including, for example, a set of remote computers deployed as a cloud computing service.

The backup system 102 can include several different functional components, including one or more engines or sub-engines. The engines or sub-engines can include one or more data processing apparatuses, can be implemented in code, or a combination of both. For instance, each of the scoring engine 106 and the action engine 160 can include one or more data processors and instructions that cause the one or more data processors to perform the operations discussed herein.

The various functional components of the backup system 102 can be installed on one or more computers as separate functional components or as different modules of a same functional component. For example, components of the backup system 102—e.g., the scoring engine 106 and the action engine 160—can be implemented as computer programs installed on one or more computers in one or more locations that are coupled to each through a network. In cloud-based systems for example, these components can be implemented by individual computing nodes of a distributed computing system.

Figure 2:
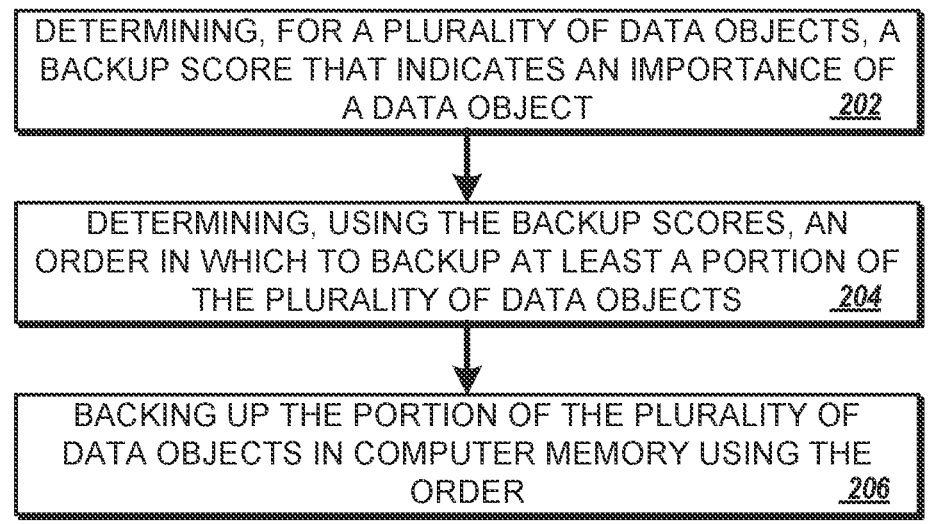
FIG. 2 shows a flowchart of an example process for backing up data.

FIG. 2 is a flowchart of an example process 200 for backing up data. For convenience, the process 200 will be described as being performed by a system of one or more computers, located in one or more locations, and programmed appropriately in accordance with this specification. For example, a backup system, e.g., the backup system 102 of FIG. 1, appropriately programmed, can perform the process 200.

The process 200 includes determining, for a plurality of data objects, a backup score that indicates an importance of a data object (202). For example, the scoring engine 106 of the backup system 102 can generate the scores 150 representing backup scores for one or more data objects included in the second data for backup 140.

The process 200 includes determining, using the backup scores, an order in which to backup at least a portion of the plurality of data objects (204). For example, the action engine 160 of the backup system 102 can prioritize one or more data objects of the second data for backup 140 using the scores 150.

The process 200 includes backing up the portion of the plurality of data objects in computer memory using the order (206). For example, the backup system 102 can obtain and backup the second data for backup 140. The backup can be prioritized using scores generated, in part, using the previously archived data 107. The action engine 160 can backup high importance data at a first location with high storage costs, at a first higher frequency, with one or more data copies for redundancy, or a combination of these. The action engine 160 can backup data with lower importance at a second location with lower storage costs compared to the first location, at a frequency lower than the first frequency, or with no or fewer data copies, or a combination of these.

The action engine 160 can store important data in storage with efficient read or write processes. For example, the action engine 160 can select one or more data objects with a first priority score in a first range or satisfying one or more thresholds for storage at a first location with M.2 SSDs with high read or write speeds. The action engine 160 can select one or more data objects with a second priority score in a second range or not satisfying one or more thresholds for storage at a second location with M.2 SSDs with comparatively lower read or write speeds. The backup system 102, using the action engine 160, can then store data objects using the data storage selections, e.g., data objects obtained from the data storage 108 included in the second data for backup 140.

In some implementations, the process 200 includes configuring backup monitoring for a data object. For example, the backup system 102 can determine that a backup score for a first data object satisfies a score threshold. The backup system 102 can configure backup monitoring for the first data object in response to determining that the backup score for the first data object satisfies the score threshold. Backup monitoring can include monitoring of backup frequency or backup integrity of a given data object, such as the first data object. Because backup monitoring can require additional processing resources, monitoring can be reserved for a subset of data objects that satisfy a score threshold to maximize backup reliability for important data objects while minimizing processing requirements.

For situations in which the systems discussed here collect or otherwise access personal or business information, the systems may provide data owners with an opportunity to control whether programs or features collect or otherwise access the information. Thus, the data owners may have control over how information is collected or accessed and used during a backup process.

In this specification, the term "database" is used broadly to refer to any collection of data: the data does not need to be structured in any particular way, or structured at all, and it can be stored on storage devices in one or more locations. A database can be implemented on any appropriate type of memory.

In this specification the term "engine" refers broadly to refer to a software-based system, subsystem, or process that is programmed to perform one or more specific functions. Generally, an engine will be implemented as one or more software modules or components, installed on one or more computers in one or more locations. In some instances, one or more computers will be dedicated to a particular engine. In some instances, multiple engines can be installed and running on the same computer or computers.

The subject matter and the actions and operations described in this specification can be implemented in digital electronic circuitry, in tangibly-embodied computer software or firmware, in computer hardware, including the structures disclosed in this specification and their structural equivalents, or in combinations of one or more of them. The subject matter and the actions and operations described in this specification can be implemented as or in one or more computer programs, e.g., one or more modules of computer program instructions, encoded on a computer program carrier, for execution by, or to control the operation of, data processing apparatus. The carrier can be a tangible non-transitory computer storage medium. Alternatively or in addition, the carrier can be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, the subject matter described in this specification can be implemented on one or more computers having, or configured to communicate with, a display device, e.g., a LCD (liquid crystal display) monitor, or a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech, or tactile feedback or responses; and input from the user can be received in any form, including acoustic, speech, tactile, or eye tracking input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it, software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

The subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some instances be excised from the combination, and the claim may be directed to a subcombination or variation of a subcombination.

Similarly, while operations are depicted in the drawings and recited in the claims in a particular order, this by itself should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some implementations, multitasking and parallel processing may be advantageous.

What is claimed is:

1. A method comprising:
as part of a data backup process for a plurality of data objects:
receiving, from data storage, a schema that indicates relationships between different types of data objects in the plurality of data objects and is separate data from the plurality of data objects;
calculating, for each of two or more data objects from the plurality of data objects and using metadata for a respective data object that includes one or more relationships from the received schema, a backup score that indicates an importance of the respective data object, wherein using the metadata includes calculating, based on one or more relationships from the received schema, an impact ratio of the respective data object and an entity rank of an entity corresponding to the data object;
determining different priority levels for two or more subsets of the plurality of data objects based at least in part on the backup scores; and
backing up at least one of the subsets of the plurality of data objects according to the respective priority levels of the subsets.

2. The method of claim 1, wherein the impact ratio is calculated based on change data of the respective data object indicating two or more changes previously made to the respective data object, and wherein the impact ratio is calculated by applying different weights to different types of changes included in the two or more changes.

3. The method of claim 1, wherein the impact ratio of the respective data object is calculated based on a relationship between a total number of changes for a given entity corresponding to the respective data object divided by the total number of changes corresponding to the plurality of data objects.

4. The method of claim 1, wherein the different types of data objects comprise at least one of different types of tables or different types of fields.

5. The method of claim 1, further comprising, as part of the data backup process:
backing up the schema.

6. The method of claim 1, wherein the backup score is further calculated based at least in part on how many changes to the respective data object were made within a time period.

7. The method of claim 1, wherein the backup score is further calculated based at least in part on how many references to the respective data object are included in other data objects in the plurality of data objects.

8. The method of claim 7, further comprising:
determining a number of references to the respective data object that are included in the other data objects in the plurality of data objects, wherein the number of references is based at least in part on one or more artifacts for the other data objects that do not include content of the other data objects.

9. The method of claim 1, wherein the backup score is further calculated based on:
determining, for a child object of the respective data object in the plurality of data objects, a child backup score.

10. The method of claim 1, wherein the backup score is further calculated based on:
determining child backup scores for all children of the respective data object; and
determining a combination score from the child backup scores.

11. The method of claim 10, wherein determining the combination score from the child backup scores comprises:
obtaining a discount factor based on at least the impact ratio or the entity rank of the respective data object; and
applying the discount factor to a summation of the child backup scores.

12. The method of claim 1, wherein the backup score is further calculated based on determining a number of references to the respective data object.

13. The method of claim 12, wherein the respective data object is a data field.

14. The method of claim 12, further comprising:
determining that the backup score of the respective data object satisfies a score threshold; and
in response to the determination, configuring backup monitoring for the respective data object.

15. The method of claim 1, wherein calculating the backup score is further performed using a backup score determined for a previously backed up instance of the respective data object.

16. The method of claim 1, further comprising, prior to backing up at least one of the subsets of the plurality of data objects:
determining using the backup scores, (1) a frequency for backing up at least one of the subsets of the plurality of data objects and (2) a location for backing up at least one of the subsets of the plurality of data objects, wherein backing up at least one of the subsets of the plurality of data objects is performed at the frequency and in the location.

17. The method of claim 16, wherein the location for storing a portion of the plurality of data objects indicates a type, from a plurality of types, of computer memory to use for backup.

18. The method of claim 1, wherein the entity rank is calculated based on reference data indicating one or more references to or from the respective data object, wherein a greater number of references to or from a first respective data object results in a greater entity rank for the first respective data object than one or more other respective data objects.

19. The method of claim 1, further comprising:
backing up, based at least in part on the backup scores, one or more of the plurality of data objects to a first location and a different second location.

20. One or more computer-readable storage media encoded with instructions that, when executed by one or more computers, cause the one or more computers to perform, as part of a data backup process for a plurality of data objects, operations comprising:
receiving, from data storage, a schema that indicates relationships between different types of data objects in the plurality of data objects and is separate data from the plurality of data objects;

calculating, for each of two or more data objects from the plurality of data objects and using metadata for a respective data object that includes one or more relationships from the received schema, a backup score that indicates an importance of the respective data object, wherein using the metadata includes calculating, based on one or more relationships from the received schema, an impact ratio of the respective data object and an entity rank of an entity corresponding to the data object;

determining different priority levels for two or more subsets of the plurality of data objects based at least in part on the backup scores; and backing up at least one of the subsets of the plurality of data objects according to the respective priority levels of the subsets.

21. A system comprising:

one or more computers and one or more storage devices on which are stored instructions that are operable, when executed by the one or more computers, to cause the one or more computers to perform, as part of a data backup process for a plurality of data objects, operations comprising:

receiving, from data storage, a schema that indicates relationships between different types of data objects in the plurality of data objects and is separate data from the plurality of data objects;

calculating, for each of two or more data objects from the plurality of data objects and using metadata for a respective data object that includes one or more relationships from the received schema, a backup score that indicates an importance of the respective data object, wherein using the metadata includes calculating, based on one or more relationships from the received schema, an impact ratio of the respective data object and an entity rank of an entity corresponding to the data object;

determining different priority levels for two or more subsets of the plurality of data objects based at least in part on the backup scores; and backing up at least one of the subsets of the plurality of data objects according to the respective priority levels of the subsets.

* * * * *